United States Patent
Prokop

(10) Patent No.: US 11,796,660 B2
(45) Date of Patent: Oct. 24, 2023

(54) SYSTEMS AND METHODS FOR CUSTOMIZED USER INTERFACE

(71) Applicant: FUJIFILM SONOSITE, INC., Bothell, WA (US)

(72) Inventor: Sara Akiko Prokop, Seattle, WA (US)

(73) Assignee: FUJIFILM SonoSite, Inc., Bothell, WA (US)

( * ) Notice: Subject to any disclaimer, the term of this patent is extended or adjusted under 35 U.S.C. 154(b) by 0 days.

(21) Appl. No.: 17/382,020

(22) Filed: Jul. 21, 2021

(65) Prior Publication Data

US 2022/0026548 A1    Jan. 27, 2022

Related U.S. Application Data

(60) Provisional application No. 63/056,374, filed on Jul. 24, 2020.

(51) Int. Cl.
   *G01S 7/52* (2006.01)
   *G06F 3/01* (2006.01)
   *G06F 3/16* (2006.01)
   *G01S 7/521* (2006.01)

(52) U.S. Cl.
   CPC .......... *G01S 7/52084* (2013.01); *G01S 7/521* (2013.01); *G01S 7/52046* (2013.01); *G06F 3/016* (2013.01); *G06F 3/167* (2013.01)

(58) Field of Classification Search
   CPC .. G01S 7/52084; G01S 7/52046; G01S 7/521; G06F 3/016; G06F 3/167
   See application file for complete search history.

(56) References Cited

U.S. PATENT DOCUMENTS

| | | | |
|---|---|---|---|
| 5,493,654 A * | 2/1996 | Gopher | G06F 3/0235 708/142 |
| 8,213,467 B2 | 7/2012 | Little et al. | |
| 8,358,277 B2 * | 1/2013 | Mosby | G06F 3/04883 345/169 |
| 2002/0015024 A1 * | 2/2002 | Westerman | G06F 3/0446 345/173 |
| 2011/0210928 A1 * | 9/2011 | Matsuda | G06F 3/04886 345/173 |
| 2012/0169611 A1 * | 7/2012 | Chen | G06F 3/04186 345/173 |

(Continued)

FOREIGN PATENT DOCUMENTS

JP    2002254950 A  *  9/2002  ......... F16H 59/0278

*Primary Examiner* — James T Tsai
(74) *Attorney, Agent, or Firm* — Colby Nipper PLLC

(57) ABSTRACT

A system, method, and apparatus for controlling an ultrasound device. The method, for example, can include indexing a location of a part of a palm of the operator on the user interface. The method can also include indexing locations of one or more fingers of an operator on a user interface based on the location of the part of the palm. The method can further include assigning one or more functions of the ultrasound device to the indexed locations of the one or more fingers on the user interface. In addition, the method can include sensing the one or more fingers of the operator near or on the indexed locations on the user interface. The method can also include performing the assigned one or more functions based on sensing the one or more fingers of the operator near or on the indexed locations.

18 Claims, 4 Drawing Sheets

(56) References Cited

U.S. PATENT DOCUMENTS

| | | | |
|---|---|---|---|
| 2015/0242118 A1* | 8/2015 | Zhang | G06F 3/041 |
| | | | 715/773 |
| 2017/0024023 A1* | 1/2017 | Suzuki | G06F 3/038 |
| 2018/0000453 A1* | 1/2018 | Hunter | G06F 3/04883 |
| 2020/0281662 A1* | 9/2020 | Cong | A61B 34/10 |
| 2021/0349592 A1* | 11/2021 | Lemcke | G06F 3/016 |

* cited by examiner

SYSTEMS AND METHODS FOR CUSTOMIZED USER INTERFACE

CROSS-REFERENCE TO RELATED APPLICATIONS

This application claims priority to U.S. Provisional Patent Application No. 63/056,374, which was filed on Jul. 24, 2020, the entire contents of which are incorporated by reference herein.

BACKGROUND

Field of Disclosed Subject Matter

The present disclosure relates generally to a user interface for controlling the functioning of an ultrasound system.

Description of Related Art

Ultrasound systems or devices are often employed for medical evaluation, diagnosis, or treatment of patients. In general, ultrasound systems can operate by emitting pulses of acoustic energy from a transducer into a region of interest. These short pulses can echo off internal body structures in the region of interest with different reflection properties to form one or more echo signals. The information from the one or more echo signals can be collected and displayed as an image. The image can be representative of the internal body structures in the region of interest.

An operator, such as a physician, health professional, or technician, can control the various functions of the ultrasound system using a control panel. The control panel can include plastic or elastomeric buttons, knobs, rockers, and/or handles for controlling one or more functionalities of the ultrasound system. However, such buttons, knobs, rockers, and/or handles can be vulnerable to harsh disinfectants, abrasion from repeated use, and fluid ingress.

An operator should also be able to control the functions of the ultrasound with one hand, while performing a medical procedure and viewing the resulting image. Given the complexity of ultrasound control panels, as well as the varying preferences, tendencies, and hand dimensions of operators, control panels are difficult to navigate. This high level of difficulty creates a steep curve for operators learning to manipulate the control panel. It also detracts from patient care, with operators tending to focus on the control panel instead of the medical procedure at hand.

Therefore, there is a need for an improved control panel for an ultrasound system or device, as well as an improved method for controlling the functionality of the ultrasound system or device.

SUMMARY

The disclosed subject matter described below provides for a non-limiting example of an improved ultrasound system, device, or apparatus, and a method for controlling the ultrasound device. For example, embodiments of the disclosed subject matter can employ a user interface with an indexing feature to guide operators to select or perform one or more functions. The disclosed embodiments can help to improve the durability and cleanability of the control panel, while also helping to improve the configurability, intuitiveness, and ease of use of the control panel.

In certain non-limiting embodiments, an example method for controlling an ultrasound device can include indexing locations of one or more fingers of an operator on a user interface. The method can also include assigning one or more functions of the ultrasound device to the indexed locations of the one or more fingers on the user interface. In addition, the method can include sensing the one or more fingers of the operator near or on the indexed locations on the user interface. Further, the method can include performing the assigned one or more functions based on sensing the one or more fingers of the operator near or on the indexed locations. In some embodiments the one or more functions can include at least one of depth, gain, image capture, and/or freeze.

In certain non-limiting embodiments another example method can include indexing a location of a palm of the operator on the user interface. The indexed location of the palm can be used, in part, to index the locations of the one or more fingers of the operator on the user interface. The method can include producing haptic or auditory feedback during the sensing of the one or more fingers of the operator near or on the indexed locations on the user interface. In addition, or in the alternative, the method can include producing haptic or auditory feedback confirming the indexing of the locations of the one or more fingers of the operator on the user interface.

In some non-limiting embodiments the method can include toggling the one or more functions to produce a second set of one or more functions of the ultrasound device on the user interface, and/or performing the second set of one or more functions based on sensing the one or more fingers of the operator near or on the indexed locations. The method can also include receiving instructions from the operator to customize the assigning of the one or more functions. In other embodiments, assigning the one or more functions of the ultrasound device to the indexed locations can be predetermined.

In another example, an ultrasound system can include a control panel for controlling one or more functions of the ultrasound system, at least one memory comprising computer program code, and/or at least one processor. The at least one memory including the computer program code can be configured, with the at least one processor, to cause the ultrasound system at least to index locations of one or more fingers of an operator on a user interface, and/or assign one or more functions of the ultrasound device to the indexed locations of the one or more fingers on the user interface. The at least one memory including the computer program code can also be configured, with the at least one processor, to cause the ultrasound system at least to sense the one or more fingers of the operator near or on the indexed locations on the user interface, and/or perform the assigned one or more functions based on sensing the one or more fingers of the operator near or on the indexed locations.

According to certain non-limiting embodiments a non-transitory computer-readable medium encodes instructions that, when executed in hardware, perform a process. The process can include indexing locations of one or more fingers of an operator on a user interface. The process can also include assigning one or more functions of the ultrasound device to the indexed locations of the one or more fingers on the user interface. In addition, the process can include sensing the one or more fingers of the operator near or on the indexed locations on the user interface. Further, the process can include performing the assigned one or more functions based on sensing the one or more fingers of the operator near or on the indexed locations.

An apparatus, in certain non-limiting embodiments, can include a computer program product encoding instructions for performing a process in accordance with the described embodiments.

DETAILED DESCRIPTION

Reference will now be made in detail to the various exemplary embodiments of the disclosed subject matter, which embodiments are illustrated in the accompanying drawings. The structure and corresponding method of operation of the disclosed subject matter will be described in conjunction with the detailed description of the system. The examples and embodiments described below are merely exemplary, and should not be taken in any way as limiting the scope of the disclosed subject matter.

In certain non-limiting embodiments a user interface with an indexing feature can be used to guide an operator to select or perform one or more functions. The user interface, for example, can be a touchscreen made of one or more layers of glass and/or plastic, and can be coated with a conductive material such as indium tin oxide or copper. The material or finish of the user interface can be fit for use in medical procedures and environments, thereby allowing the user interface to be cleaned by the harshest disinfectant on repeated basis.

The user interface can help to improve the usability, configurability, and intuitiveness of the ultrasound system. In some non-limiting embodiments, the location of one or more fingers of an operator can be indexed on the user interface. One or more functions of the ultrasound device or system can then be assigned to the indexed locations on the user interface. Haptic or auditory feedback can be produced when one or more fingers of the operator are near or on the indexed locations on the user interface. In other words, haptic or auditory feedback can be produced when one or more functions of the ultrasound device are activated. The feedback and/or indexing can allow an operator to control the ultrasound device while limiting or minimizing the amount of time spent looking at the user interface itself. As such, instead of focusing on the user interface, the operator can focus on the transducer, diagnostic image on the clinical display, or the medical procedure being performed.

Certain non-limiting embodiments can also improve the configurability of the ultrasound system or device. For example, the performed indexing of the one or more fingers of the operator and/or the palm of the operator can be used to configure the user interface to different hand sizes and finger length of the operator. In some non-limiting embodiments the operator can also customize the assigned one or more functions, allowing the operator to configure the preferred indexed locations of the one or more fingers to preferred one or more functions. In addition, or as an alternative, certain non-limiting embodiments can improve the intuitiveness of controlling or operating the ultrasound system or device. For example, the one or more assigned functions to the one or more indexed locations can be often used, important, preferred, or core features of the ultrasound system or device. Such assigning can help simplify the operation of the ultrasound system or device.

Figure 1:
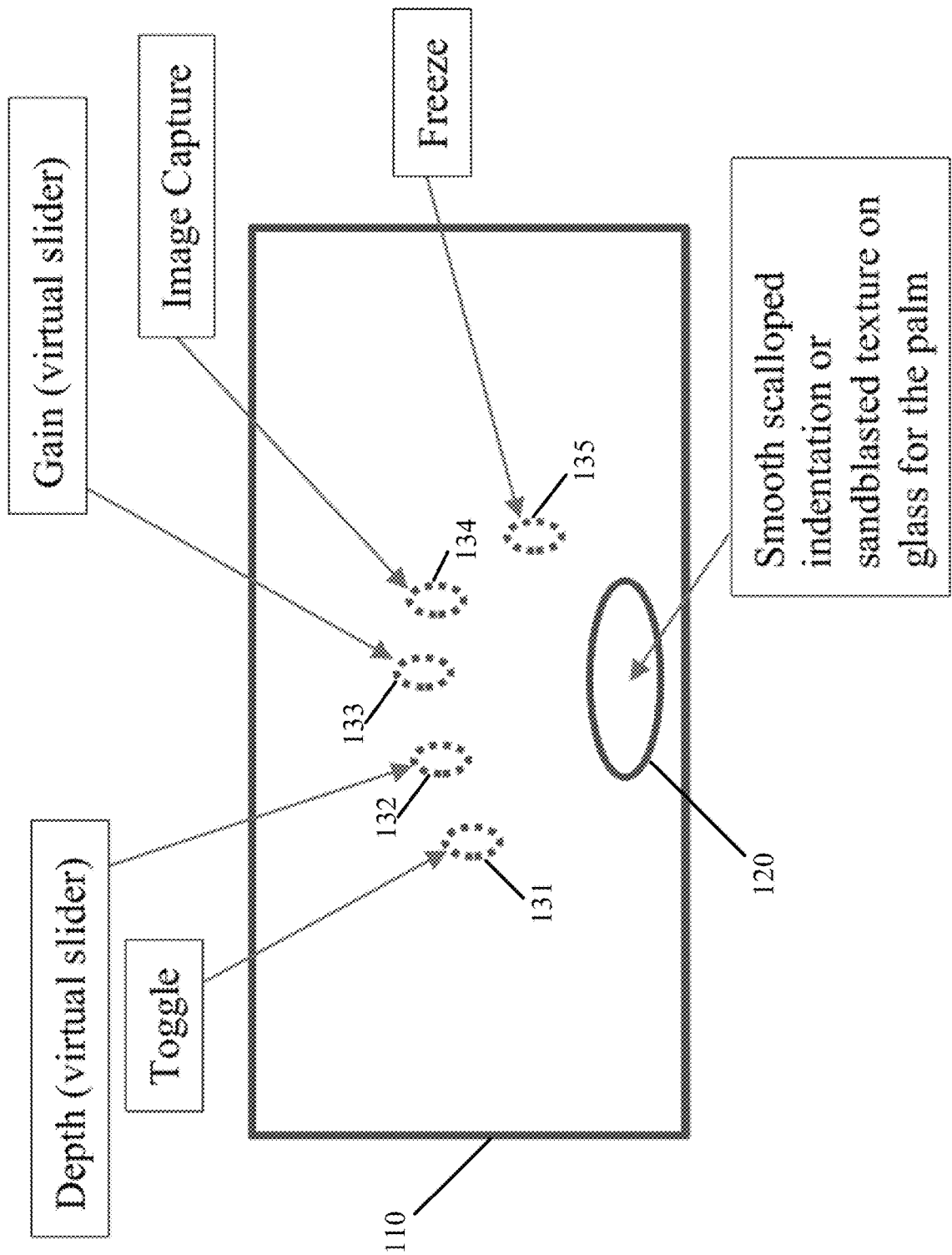
FIG. 1 is a diagram illustrating a user interface according to some examples of the disclosed subject matter.

FIG. 1 is a diagram illustrating a user interface according to some examples of the disclosed subject matter. In particular, FIG. 1 illustrates an example user interface 110 according to certain embodiments. In certain non-limiting embodiments the user interface 110 can be located on the control panel. The user interface 110 can be used to control one or more functions of the ultrasound device or system. While in some embodiments all of the functions of the ultrasound device or system can be controlled via the user interface 110 without use of buttons, knobs, rockers, and/or handles, in other embodiments one or more functions can be controlled by buttons, knobs, rockers, and/or handles. In other words, in certain non-limiting embodiments the control panel can include both the user interface 110 and at least one button, knob, rocker, or handle to control one or more functions of the ultrasound device or system.

As previously described, in some non-limiting embodiments the user interface 110 can be a touchscreen composed of one or more layers of glass, plastic, and/or any other material or composite known in the art. As shown in FIG. 1, the user interface 110 can include a palm indexing location 120 for the operator. For example, the palm indexing location 120 can be a glass molded indentation, such as a smooth scalloped indentation. In some other embodiments, palm indexing location 120 can be an area with a sandblasted texture, or any other marking, surface texture, molding, indentation, shape, or color. Palm indexing location 120 can help to guide a part of the operator's palm to a predetermined location on the glass. For example, palm indexing location 120 can help guide the lower part of the palm closest to the wrist to a predetermined location on the glass. After the operator places their palm on or near palm indexing location 120, the user interface can sense the placement of and index the location of the palm. In certain non-limiting embodiments, the indexing location of one or more fingers of an operator can be determined based on palm indexing location 120.

In certain non-limiting embodiments, the user interface can be without any predetermined palm indexing location 120. In such embodiments, the surface of the user interface can be smooth with no marking, surface texture, molding, indentation, shape, or color to indicate the palm indexing location 120. Instead, an operator can place a palm on any location on the user interface. User interface 110, which can be a touchscreen, can then sense and/or index the location of the palm.

In certain non-limiting embodiments, the location of one or more fingers of an operator on user interface 110 can be indexed. The indexing of the location of the one or more fingers, in some non-limiting embodiments, can in part be based on indexed location 120 of the palm of the operator. In other non-limiting embodiments, the location of the one or more fingers can be independently indexed without accounting for the location of the palm. In such embodiments the palm of the operator can be placed either on or off the user interface. In some examples, the location of the one or more fingers can be sensed by a touchscreen. Based on the sensed pressure and/or sensed surface area of the one or more fingers, the user interface can sense multiple touch locations. In certain non-limiting embodiments, the one or more fingerprints of the one or more fingers can be detected and/or stored. The one or more fingerprints can be associated with an operator profile. In some non-limiting embodiments the ultrasound system or device can determine whether the operator is using a left hand or a right hand on the user interface. For example, the left or right hand could be differentiated based on the position of the thumb with respect to the other fingers and/or based on the thumb being generally shorter. In other examples, the operator being left or right handed can be associated with the operator's profile. The location of the one or more fingers can be indexed, in part, based on whether the operator is using the left or right hand.

As shown in FIG. 1, the location of five fingers 131, 132, 133, 134, and 135 on user interface 110 can be indexed. In some other embodiments, the location of one, two, three, or four fingers on user interface 110 can be indexed. After the locations are indexed, one or more functions of the ultrasound system or device can be assigned to the indexed locations of the one or more fingers on the user interface. As shown in FIG. 1 each finger location can be assigned one initial function. For example, these initial functions can be often used functions, such as depth, gain, image capture, or freeze. In FIG. 1, indexed finger locations 131, 132, 133, 134, and 135 can be assigned the toggle, depth, gain, image capture, and freeze functions, respectively. In some non-limiting embodiments, the depth and gain functions can be controlled using one or more virtual sliders. The virtual sliders, for example, can be used for an up and/or down adjustment of the depth and/or gain.

In certain non-limiting embodiments, each of the one or more finger locations can be assigned a second set of one or more functions. These other functions can be accessed by pressing a designated location on the user interface or swiping, sliding, or gliding one or more fingers of the operator in a designated direction. In some other embodiments, the other functions can be accessed simply by placing the entire palm surface of the operator on the user interface, simultaneously pressing two or more fingers on the user interface, or swiping the operator's finger either vertically or horizontally across the user interface. The second set of one or more functions can be accessed using any other known method or technique. For example, as shown in FIG. 1, finger location 131 can be assigned a toggle function. The operator can press or activate the toggle function to access the second set of one or more functions. In certain embodiments the first set of one or more functions can be activated by the operator in a first mode, while the second set of one or more functions can be activated by the operator in a second mode or another mode.

In some non-limiting embodiments the one or more functions assigned to the indexed locations of the one or more fingers can be predetermined. In other embodiments, the operator can customize the assignment of the one or more functions to one or more fingers. For example, an operator may prefer to have the freeze function assigned to the indexed location of the index finger as opposed to the thumb. This customization can occur either before or after the initial indexing of the one or more fingers.

The indexing of the one or more finger locations and/or the customization of the assigned one or more functions can be saved to the memory of the ultrasound system or device, and/or to the memory of a separate hardware or cloud-based server. In certain non-limiting embodiments, the indexing of the one or more finger locations and/or the customization of the assigned one or more functions can be associated with an operator profile, an operator username, or an operator identification. This saved indexing of the one or more finger locations and/or the customization of the assigned one or more functions can be automatically or manually applied or uploaded to an ultrasound system or device. For example, the ultrasound system or device can sense or detect a hospital identification of an operator and automatically apply or upload the saved indexed locations and/or assigned one or more functions. In another example, the operator can manually input a username or identification, after which the ultrasound system or device can apply or upload the saved indexed locations or assigned one or more functions.

Haptic or auditory feedback can be provided or produced by the ultrasound system or device in certain non-limiting embodiments. For example, haptic or auditory feedback can be produced to indicate and/or confirm that the location of the one or more fingers or part of the palm have been indexed. In some other non-limiting embodiments, after indexing haptic or auditory feedback can be produced when one or more fingers of the operator are sensed or detected near or on the indexed locations on the user interface. The haptic or auditory feedback can indicate to the operator that they are near or on an indexed location of one or more fingers on the user interface. Using haptic or auditory feedback, or any other feedback known in the art, can help the operator choose one or more functions of the ultrasound system or device, while minimizing or limiting the need for the operator to look at the user interface.

In certain non-limiting embodiments one or more characteristics of the haptic or auditory feedback can be specific to one or more functions or to one or more indexed locations. For example, the freeze function can be associated with a one second haptic feedback, while the gain function can be associated with a three second haptic feedback. In other examples, the image capture function can be associated with a single beep or chime, while the depth function can be associated with two consecutive beeps or chimes. In yet another example, when the operator's thumb is located near or on the indexed location a one second haptic feedback can be produced. In another example, when the operator's index finger is located near or on the indexed location a three second haptic feedback can be produced. In a further example, when using the virtual slider to adjust the depth, gain, or any other feature, haptic or auditory feedback can be used to signal the adjustment of the function. In some non-limiting embodiments different auditory and/or haptic feedback can be used to indicate whether the virtual slider increases or decreases the depth, gain, and/or any other feature. In certain non-limiting embodiments, the auditory or haptic feedback can increase in tempo and/or frequency according to the speed of the swipe applied by the operator to the virtual slider or the user interface. In other non-limiting embodiments, a given swipe or gesture applied by the operator to the user interface can be associated with a specific auditory or haptic feedback.

Figure 2:
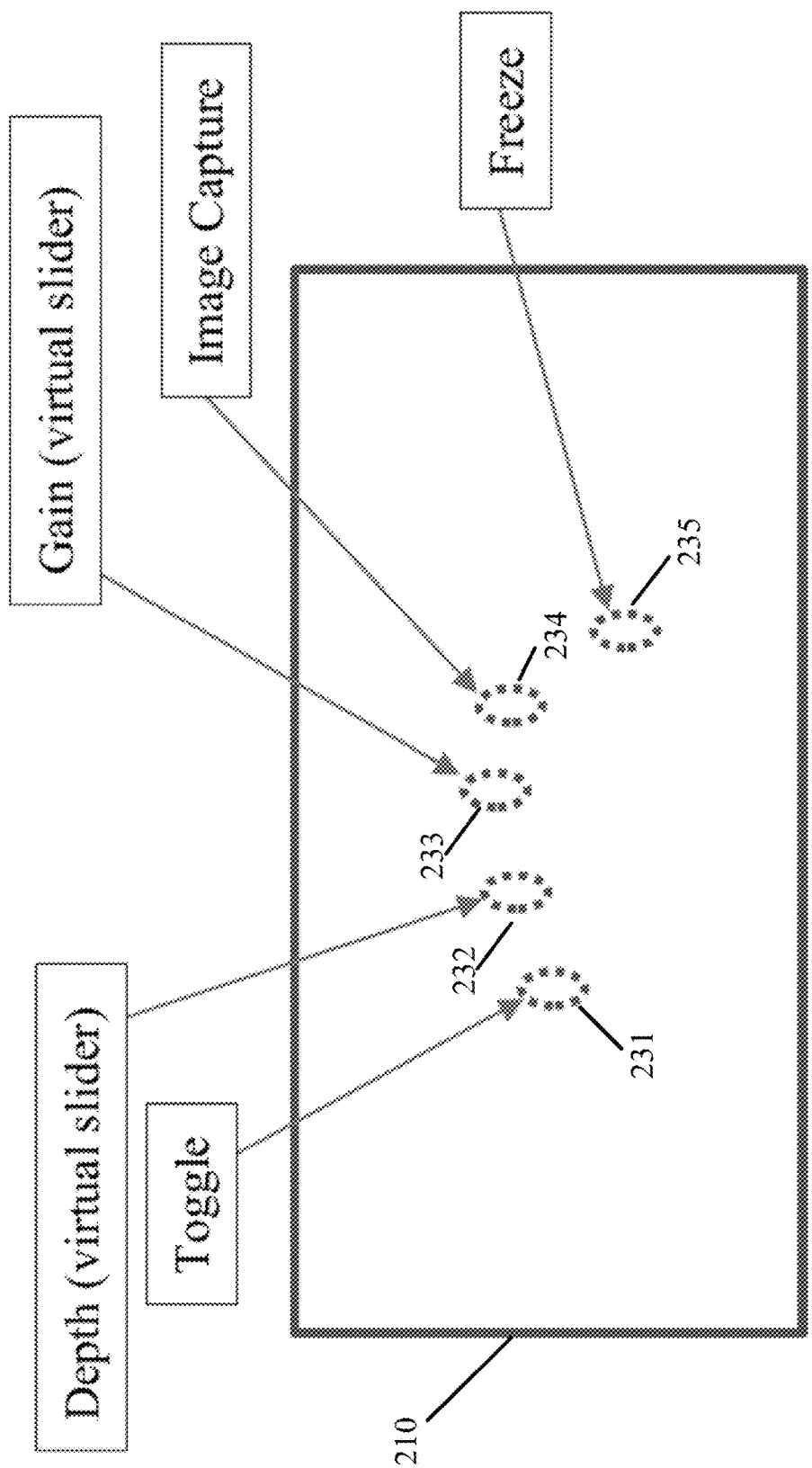
FIG. 2 is a diagram illustrating a user interface according to some examples of the disclosed subject matter.

FIG. 2 is a diagram illustrating a user interface according to some examples of the disclosed subject matter. In particular, FIG. 2 illustrates an example user interface 210 according to certain embodiments. User interface 210 can include five indexed finger locations 231, 232, 233, 234, and 235, similar to locations 131, 132, 133, 134, and 135 shown in FIG. 1. In FIG. 2, indexed finger locations 231, 232, 233, 234, and 235 can be assigned the toggle, depth, gain, image capture, and freeze functions, respectively. Unlike user interface 110 shown in FIG. 1, user interface 210 shown in FIG. 2 does not include a palm indexing location. In certain non-limiting embodiments, part of the operator's palm is not placed on the user interface. For example, a part of the operator's palm can be located on the control panel outside the user interface. In the embodiment shown in FIG. 2, the one or more finger locations can be indexed without accounting for part of the operator's palm.

Figure 3:
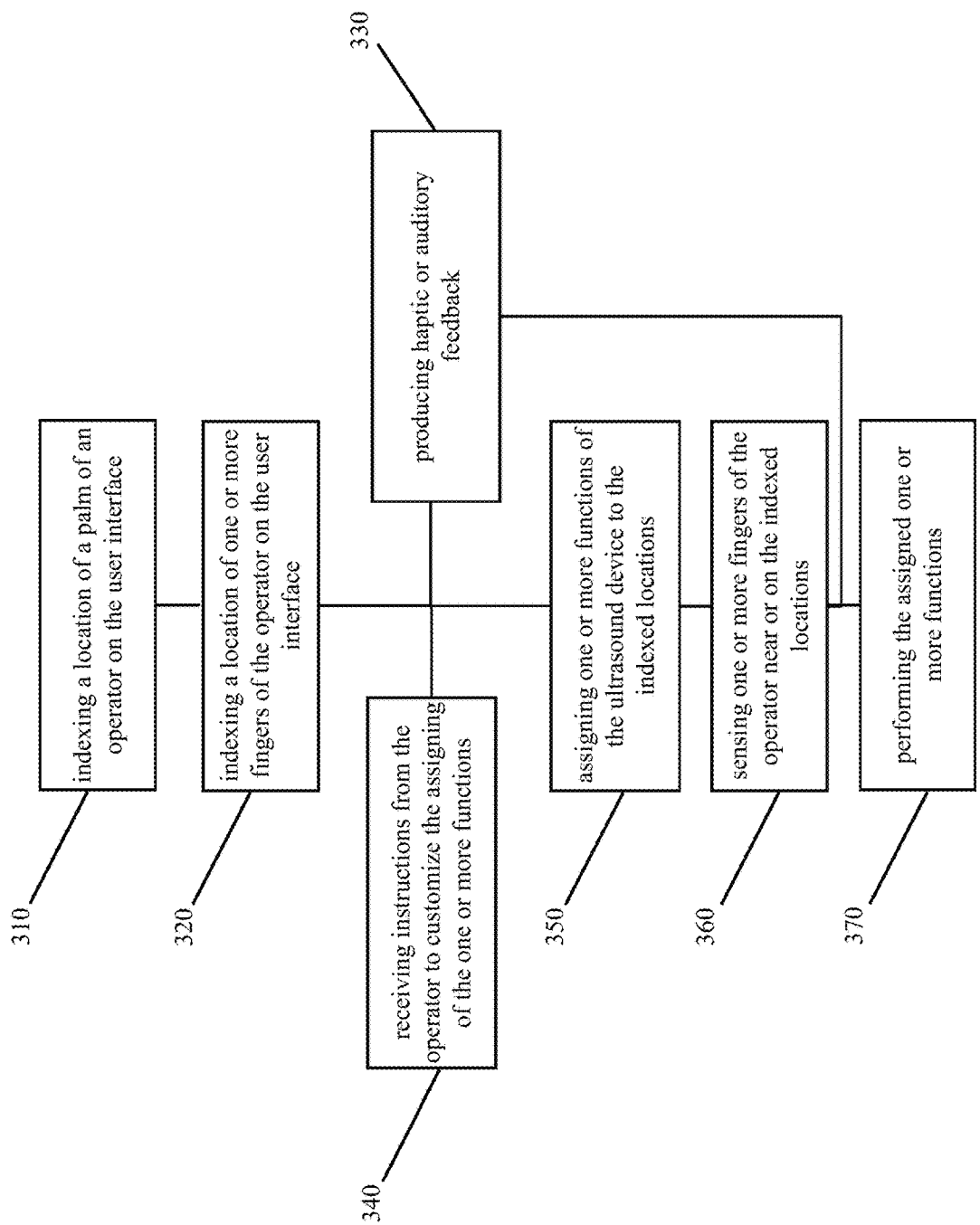
FIG. 3 is a flow diagram of a method or process according to some examples of the disclosed subject matter.

FIG. 3 is a flow diagram of a method or process according to some examples of the disclosed subject matter. In particular, the method or process can be performed by any apparatus that includes a processor and memory, such as an ultrasound system, ultrasound device, medical imaging device, or any other device that includes a processor and memory. In step 310, the method or process can include indexing a location of a part of a palm of an operator on the user interface. The location of the palm can be marked by an indentation or a sandblasted texture on the user interface. In step 320, the method or process can include indexing locations of one or more fingers of an operator on the user interface. In some non-limiting embodiments, the indexed location of the part of the palm can be used to index the locations of the one or more fingers of the operator on the user interface. In step 330, haptic or auditory feedback can be produced to confirm the indexing of the locations of the one or more fingers of the operator on the user interface.

In certain non-limiting embodiments, the ultrasound device or system can receive instructions from the operator to customize the assigning of the one or more functions, as shown in step 340. In some other non-limiting embodiments, the assigning of the one or more functions of the ultrasound device to the indexed locations can be predetermined. In step 350, the one or more functions of the ultrasound device can be assigned to the indexed locations of the one or more fingers on the user interface. The one or more functions can include at least one of depth, gain, image capture, or freeze. In step 360, the one or more fingers of the operator can be sensed near or on the indexed locations on the user interface. In some non-limiting embodiments, haptic or auditory feedback can be produced during the sensing of the one or more fingers of the operator near or on the indexed locations on the user interface, as shown in step 330. In step 370, the assigned one or more functions can be performed based on the sensing of the one or more fingers of the operator near or on the indexed locations.

In some non-limiting embodiments, the method or process can include toggling the one or more functions to produce a second set of the one or more functions of the ultrasound device on the user interface. The method or process can also include performing the second set of the one or more functions based on the sensing of the one or more fingers of the operator near or on the indexed locations.

Figure 4:
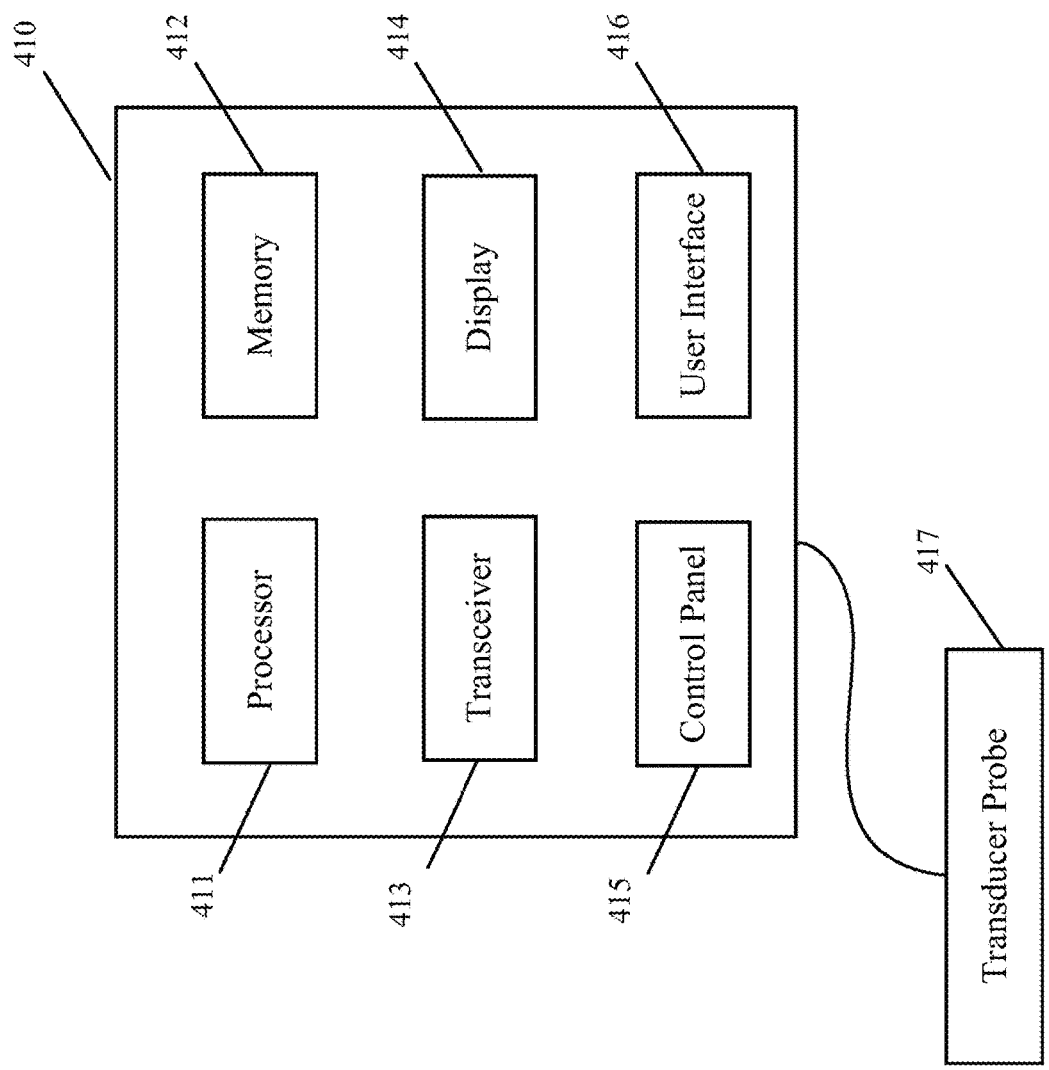
FIG. 4 is a diagram illustrating exemplary components of a system or apparatus according to some examples of the disclosed subject matter.

FIG. 4 is an example of an apparatus according to some non-limiting embodiments of the disclosed subject matter. In particular, FIG. 4 illustrates an apparatus 410, such as a computer, mobile device, medical imaging device, ultrasound system or device, or any other device that includes a processor 411, memory 412, and/or graphical user interface 414. In one embodiment the apparatus can be an ultrasound system, for example, a portable point-of-care ultrasound, which can be hand held, portable, or cart-based. It should be understood that each feature of FIGS. 1-4, and any combination thereof, can be implemented by an apparatus or an ultrasound system or device, using various hardware, software, firmware, and/or one or more processors or circuitry, in connection with various different embodiments of the disclosed subject matter.

In one embodiment, the apparatus can include at least one processor 411 or control unit. At least one memory 412 can also be provided in each apparatus. Memory 412 can include computer program instructions or computer code contained therein, which instructions or code can be executed by the processor. The system can also include networked components communicating over a local network, a wide area network, wirelessly and/or wired, or by any other coupling that allows communication of data from one system component to another.

In certain non-limiting embodiments one or more transceivers 413 can be provided. The one or more transceivers 413 can receive signals from transducer probe 417, also referred to as transducer, which transmits and/or receives sound waves to and from the subject or body being examined. Transducer probe 417 can transmit the signal to apparatus 410 via a wireless or wired communication.

Transducer probe 417 can transmit sound waves of various frequencies and receive echo signals. The sound waves, for example, can range from a low bandwidth frequency of 1 Megahertz (MHz) to a high frequency of 71 MHz, or more particularly between 1 MHz to 19 MHz. Other non-limiting embodiments can use any other soundwave frequency. Higher frequencies can allow for the imaging of superficial structures, while lower frequencies can allow for the deeper tissue imaging with each typically providing different resolutions. Transducer probe 417 can in some non-limiting embodiments also include a beamformer.

In some non-limiting embodiments, transducer probe 417 can be a single element or a multi-element transducer that is moved to sweep the transducer over a range of beam angles. Transducer probe 417 can use either wired or wireless communication to send and/or receive information to apparatus 410. The transmitted information can be saved in memory 412, or in any other external memory or database.

The ultrasound system can also include any other component not shown in FIG. 4, such as an analog front-end that includes, for example, a low noise amplifier (LNA), a voltage controlled attenuator (VCAT), an analog to digital converter, and/or a beamformer receiver. Once the analog sound signal is received by the probe, it can be amplified on the front end of the ultrasound system and converted into a digital format using any known analog to digital converter. Once converted into digital form, the signal can be transmitted to apparatus 410. Apparatus 410 can include or be connected to display 414, which can display the received digital information.

In certain non-limiting embodiments, display 414 can be located in a separate apparatus from apparatus or ultrasound machine 410. In yet another example, instead of a display the apparatus can include a projector capable of projecting the image onto an external display or screen, or can include active eyeglasses or a headset that can be worn by the operator of the ultrasound system in order to view the displayed data.

In some non-limiting embodiments, apparatus 410 can be a medical imaging device, such as an ultrasound system, configured to carry out the embodiments described above in relation to FIGS. 1-3. In certain non-limiting embodiments, at least one memory including computer program code can be configured to, when executed by the at least one processor, cause the apparatus to perform any or all of the processes described herein. Processor 411 can be embodied by any computational or data processing device, such as a central processing unit (CPU), digital signal processor (DSP), application specific integrated circuit (ASIC), programmable logic devices (PLDs), field programmable gate arrays (FPGAs), input/output (I/O) circuitry, digitally enhanced circuits, or comparable device, or any combination thereof. In one example, the ASIC described in U.S. Pat. No. 8,213,467 can be used. U.S. Pat. No. 8,213,467 is hereby incorporated by reference in its entirety. The processors can be implemented as a single controller, or a plurality of controllers or processors.

The ultrasound system can also include a system control panel 415. System control panel 415 can include user interface 416, as shown in FIGS. 1 and 2. In some other embodiments user interface 416 can be a separate piece of hardware that is not located on control panel 415. User interface 416 can be a touch screen made of glass or any other material known to a person of skill in the art. In certain embodiments, user interface 416 can include an area with a molded indentation or a different texture, such as a sand-blasted texture. The palm of the operator can be placed on the area of user interface 416 with a molded indentation or a different texture.

For firmware or software, the implementation can include modules or a unit of at least one chip set (for example, including procedures and/or functions). Memory 412 can independently be any suitable storage device, such as a non-transitory computer-readable medium, a hard disk drive (HDD), random access memory (RAM), flash memory, or other suitable memory. The memories can be combined on a single integrated circuit with a processor, or can be separate therefrom. Furthermore, the computer program instructions can be stored in the memory and be processed by the processors, and can be any suitable form of computer program code, for example, a compiled or interpreted computer program written in any suitable programming language. For example, in certain non-limiting embodiments, a non-transitory computer-readable medium can be encoded with computer instructions or one or more computer programs (such as added or updated software routine, applet or macro) that, when executed in hardware, can perform a process such as one of the processes described herein. Computer programs can be coded by a programming language, which can be a high-level programming language, such as objective-C, C, C++, C#, Java, etc., or a low-level programming language, such as a machine language, or assembler. Alternatively, certain non-limiting embodiments can be performed entirely in hardware.

The above embodiments provide significant technical improvements and advantages to the ultrasound system or device. In particular, the features described above significantly improve the usability and configurability of the ultrasound system or device. Indexing the location of one or more fingers can allow the operator to easily navigate, control, or manipulate the ultrasound system or device. Allowing the operator to customize the one or more functions can also improve the configurability of the ultrasound system or device. Further, simplifying the user interface to allow the operator to easily access core functions of the ultrasound system or device can reduce the learning curve needed to operate the ultrasound system or device.

The features, structures, or characteristics of certain embodiments described throughout this specification can be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment can be included in at least one embodiment of the disclosed subject matter. Thus, appearance of the phrases "in certain embodiments," "in some embodiments," "in other embodiments," or other similar language, throughout this specification does not necessarily refer to the same group of embodiments, and the described features, structures, or characteristics can be combined in any suitable manner in one or more embodiments.

One having ordinary skill in the art will readily understand that the disclosed subject matter as discussed above can be practiced with procedures in a different order, and/or with hardware elements in configurations which are different from those disclosed. Therefore, although the disclosed subject matter has been described based upon these embodiments, it would be apparent to those of skill in the art that certain modifications, variations, and alternative constructions would be apparent, while remaining within the scope of the disclosed subject matter.

What is claimed is:

1. A method for controlling an ultrasound device, comprising:
   sensing a part of a palm of an operator touching a user interface comprising a touchscreen;
   indexing a palm location corresponding to a location on the user interface touched by the part of the palm of the operator;
   indexing finger locations on the user interface, based at least in part on the indexed palm location on the user interface;
   assigning one or more functions of the ultrasound device to the indexed finger locations on the user interface;
   sensing one or more fingers of the operator near or on one or more of the indexed finger locations; and
   performing a respective function of the assigned one or more functions responsive to sensing the one or more fingers of the operator near or on the one or more of the indexed finger locations.

2. The method of claim 1, wherein the one or more functions comprise at least one of depth, gain, image capture, or freeze.

3. The method of claim 1, further comprising:
   producing haptic or auditory feedback during the sensing of the one or more fingers of the operator near or on the one or more of the indexed finger locations.

4. The method of claim 1, further comprising:
   producing haptic or auditory feedback confirming the indexing of the finger locations on the user interface.

5. The method of claim 1, further comprising:
   toggling the one or more functions to produce a second set of the one or more functions of the ultrasound device on the user interface; and
   performing the second set of the one or more functions based on sensing the one or more fingers of the operator near or on the one or more of the indexed finger locations.

6. The method of claim 1, wherein assigning the one or more functions of the ultrasound device to the indexed finger locations further comprises:
   receiving instructions from the operator to customize the assigning of the one or more functions.

7. The method of claim 1, wherein assigning one or more functions of the ultrasound device to the indexed finger locations is predetermined.

8. The method of claim 1, wherein the indexed palm location is not predetermined.

9. An ultrasound system comprising:
   a control panel for controlling one or more functions of the ultrasound system;
   at least one processor; and at least one memory comprising a computer program code, the at least one memory configured, with the at least one processor, to cause the ultrasound system at least to:
  sense a part of a palm of an operator touching a user interface comprising a touchscreen;
  index a palm location corresponding to a location on the user interface touched by the part of the palm of the operator;
  index finger locations on the user interface based at least in part on the indexed palm location;
  assign one or more functions of the ultrasound system to the indexed finger locations on the user interface;
  sense one or more fingers of the operator near or on one or more of the indexed finger locations on the user interface; and
  perform one of the assigned one or more functions responsive to the one or more fingers of the operator being sensed near or on one or more of the indexed finger locations.

10. The ultrasound system of claim 9, wherein the one or more functions comprise at least one of depth, gain, image capture, or freeze.

11. The ultrasound system of claim 9, wherein the at least one memory comprising the computer program code is configured, with the at least one processor, to cause the ultrasound system at least to:
  produce haptic or auditory feedback while sensing the one or more fingers of the operator near or on the indexed finger locations on the user interface.

12. The ultrasound system of claim 9, wherein the at least one memory comprising the computer program code is configured, with the at least one processor, to cause the ultrasound system at least to:
  produce haptic or auditory feedback confirming indexing of the finger locations on the user interface.

13. The ultrasound system of claim 9, wherein the at least one memory comprising the computer program code is configured, with the at least one processor, to cause the ultrasound system at least to:
  toggle the one or more functions to produce a second set of one or more functions of the ultrasound system on the user interface; and
  perform the second set of one or more functions based on sensing the one or more fingers of the operator near or on the indexed finger locations.

14. The ultrasound system of claim 9, wherein the assignment of one or more functions of the ultrasound system to the indexed finger locations is predetermined.

15. The ultrasound system of claim 9, wherein the indexed palm location is not predetermined.

16. The ultrasound system of claim 9, wherein the at least one memory comprising the computer program code is configured, with the at least one processor, to cause the ultrasound system at least to:
  receive instructions from the operator to customize the assignment of the one or more functions.

17. One or more computer-readable non-transitory storage media embodying software that is operable when executed to:
  sense a part of a palm of an operator touching a user interface comprising a touchscreen;
  index a palm location corresponding to a location on the user interface touched by the part of the palm of the operator;
  index finger locations on the user interface based at least in part on the indexed palm location on the user interface of the part of the palm;
  assign one or more functions of an ultrasound device to the indexed finger locations on the user interface;
  sense one or more fingers of the operator near or on one or more of the indexed finger locations on the user interface; and
  perform a respective function of the assigned one or more functions responsive to the one or more fingers of the operator being sensed near or on the one or more of the indexed finger locations.

18. The one or more computer-readable non-transitory storage media of claim 17, wherein the indexed palm location is not predetermined.

* * * * *